United States Patent
Choudary et al.

(10) Patent No.: US 6,173,970 B1
(45) Date of Patent: Jan. 16, 2001

(54) GASKET AND METHOD OF MAKING A GASKET

(75) Inventors: Hafeez Choudary, Stroudsburg; Kenneth M. Robinson, Saylorsburg, both of PA (US)

(73) Assignee: Instrument Specialties Co., Inc., Delaware Water Gap, PA (US)

( * ) Notice: Under 35 U.S.C. 154(b), the term of this patent shall be extended for 0 days.

(21) Appl. No.: 09/165,645

(22) Filed: Oct. 2, 1998

(51) Int. Cl.⁷ ............................................. F16J 15/02
(52) U.S. Cl. .................... 277/644; 277/650; 277/652; 277/920
(58) Field of Search ...................... 277/920, 650, 277/944, 933, 941, 942, 938, 936, 644, 652, 653, 654

(56) References Cited

U.S. PATENT DOCUMENTS

| | | | |
|---|---|---|---|
| 3,140,342 | * | 7/1964 | Ehrreich et al. . |
| 3,752,899 | * | 8/1973 | Bakker ........................... 174/35 GC |
| 4,931,326 | * | 6/1990 | Weil ................................... 428/35.8 |
| 4,968,854 | * | 11/1990 | Benn, Sr. et al. ............... 174/35 GC |
| 4,977,295 | * | 12/1990 | Chin et al. ....................... 174/35 GC |
| 5,013,379 | * | 5/1991 | Brooks et al. ................... 156/244.11 |
| 5,045,635 | | 9/1991 | Kaplo et al. . |
| 5,107,071 | * | 4/1992 | Nakagawa ....................... 174/35 GC |
| 5,120,903 | * | 6/1992 | Tam ................................. 174/35 GC |
| 5,141,770 | * | 8/1992 | Benn, Sr. et al. ..................... 427/58 |
| 5,142,101 | | 8/1992 | Matsuzaki et al. . |
| 5,294,270 | | 3/1994 | Fenical . |
| 5,386,345 | | 1/1995 | Matsuzaki et al. . |
| 5,603,514 | | 2/1997 | Jencks . |
| 5,804,762 | | 9/1998 | Jones et al. . |
| 5,889,229 | | 3/1999 | Sosnowski . |

* cited by examiner

Primary Examiner—Anthony Knight
Assistant Examiner—Alison K. Pickard
(74) Attorney, Agent, or Firm—Burns, Doane, Swecker & Mathis, L.L.P.

(57) ABSTRACT

A gasket includes an elongated strip including a first resilient gasket component and a second resilient gasket component having shielding properties, the first and second gasket components being joined together. A method for making a gasket is also disclosed.

19 Claims, 4 Drawing Sheets

GASKET AND METHOD OF MAKING A GASKET

FIELD OF THE INVENTION

The present invention relates to a gasket and method for making a gasket and, more particularly, to a gasket combining functions such as electromagnetic interference or radio frequency interference (EMI/RFI) shielding, environmental protection, and galvanic protection attributes and method for making such a gasket.

BACKGROUND AND SUMMARY OF THE INVENTION

As is well known, selected electric or electronic parts radiate electromagnetic waves which can cause noise or unwanted signals to appear in electric or electronic parts and devices existing in the vicinity of the radiating parts. Accordingly, it is highly desirable to provide shielding and/or grounding for electronic components that use circuitry that emits or is susceptible to electromagnetic radiation. It is known that these components can be shielded to reduce undesirable electromagnetic interference and/or susceptibility effects with the use of a conductive shield that reflects or dissipates the electromagnetic charges and fields. Such shielding may be grounded to allow the offending electrical charges and fields to be dissipated without disrupting the operation of the electronic components enclosed within the shield.

Various types of EMI/RFI shielding devices are known for reducing the transmission of EMI and RFI. Among the known devices are gaskets or strips of a resiliently deformable material which are secured to an openable, movable, or removable access panel, door, drawer, or the like (hereinafter "door"), to block the transmission of EMI/RFI through the small clearance between the door and the adjacent structure which forms the opening into and out of which the door is movable. Such strips are useful for shielding openings of housings for electronic components which are highly sensitive to the adverse effects of EMI/RFI.

Such known devices are typically made of one of several materials which have the combined functions of acting as an EMI/RFI shield, and which are resiliently deformable so that they can be compressed between the door when closed, and will spring back to an uncompressed configuration when the door is moved out of the opening. U.S. patent application Ser. No. 08/819,983, filed Mar. 18, 1997, entitled "SELF-TERMINATING, KNITTED METALIZED YARN EMI/RFI SHIELDING GASKET," now U. S. Pat. No. 5,889,299 which is hereby incorporated by reference, provides examples of such gaskets.

One difficulty with known gaskets for providing EMI/RFI shielding is that the gasket material, while resilient, is not as compressible and resilient as other materials. The reduced compressibility sometimes makes it difficult for the gasket to provide a proper environmental shield, and the reduced resilience sometimes makes it difficult for the gasket to spring back into its original shape when compression on the gasket is removed. It is desirable to provide a gasket that combines high levels of EMI/RFI shielding with high compressibility and resilience characteristics to provide high levels of environmental shielding.

Another problem with EMI/RFI shielding gaskets is that conductive elastomers tend to be expensive as compared to other gasket materials. It is desirable to provide a gasket that is inexpensive and simple to install.

In accordance with one aspect of the present invention, a gasket is provided that includes an elongated strip including a first resilient gasket component and a second resilient gasket component having shielding properties, the first and second gasket components being joined together.

In accordance with another aspect of the present invention, a method for making a gasket is disclosed. According to the method, a first resilient gasket component is formed, a second resilient gasket component, the second gasket component having shielding properties is formed, and the first gasket component to the second gasket component are joined.

In accordance with yet another aspect of the present invention, a gasket is provided that includes an elongated strip including a first resilient gasket component and a second resilient gasket component of a different material than the first gasket component, the first and second gasket components being joined together.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
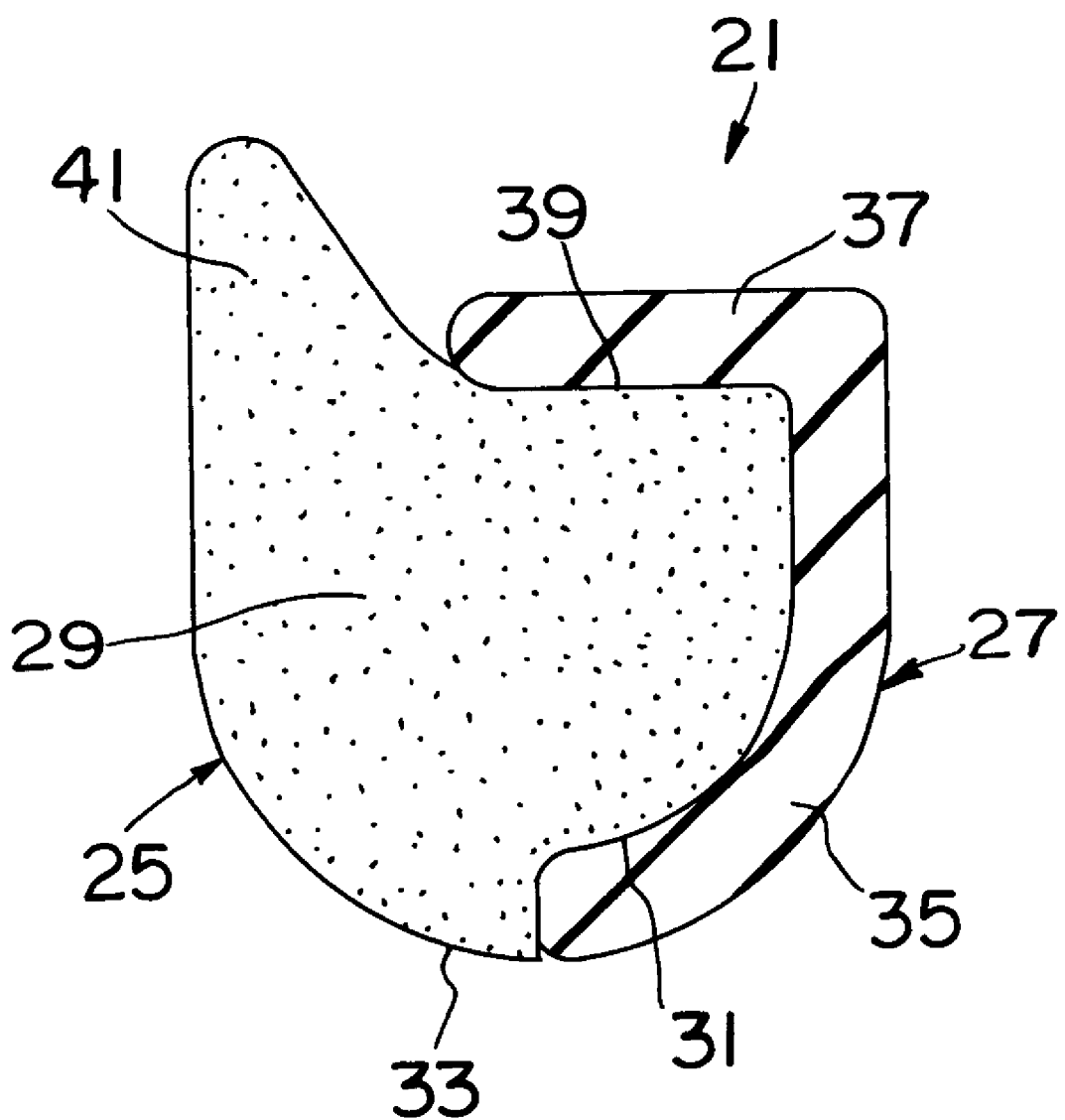
FIG. 1; is a cross-sectional view of a gasket according to an embodiment of the present invention.

A gasket 21 according to an embodiment of the present invention is shown in FIG. 1. The gasket 21 includes an elongated strip including a first, resilient, preferably extruded gasket component 25 and a second, resilient, preferably extruded gasket component 27. The first and second gasket components 25 and 27 are preferably extruded components, however, they may be formed in some other way, such as by molding/co-molding. By forming the first and second gasket components 25 and 27 as extrusions and, more preferably, as coextrusions, the components may be made inexpensively and with relatively non-complex equipment.

The first gasket component 25 preferably has good environmental sealing properties, and the second gasket component 27 is preferably a conductive elastomer and preferably has good EMI/RFI shielding properties. While a preferred embodiment of the present invention is a gasket providing EMI/RFI shielding, it will be appreciated that the first and second gasket components may have characteristics other than, or in addition to EMI/RFI and environmental shielding. For example, the gasket 21 also preferably provides good galvanic protection properties. The first and second gasket components 25 and 27 are joined together.

The first gasket component 25 is preferably a closed cell, silicone sponge. Alternatively, the first gasket component 25 can be another material, such as an open cell sponge, preferably treated with silicone to aid in providing environmental protection. The second gasket component 27 is preferably a conductive material-filled silicone, preferably a conductive elastomer such as nickel-filled silicone; other fillers may include silver-plated aluminum, silver-plated glass, nickel-coated graphite, and passivated aluminum. Other suitable materials include fluoro-silicone elastomers, which are well-suited for standing up to environments having high hydrocarbon levels. The first gasket component 25 is preferably more readily compressible than the second gasket component 27 to assist in providing an environmental seal at doors, windows, and other openings. The first gasket component 25 is preferably capable of being repeatedly compressed and has shape memory to thereafter return to its original shape, and is of a sufficient size to seal the gap into which it is intended to be used and to assist the second gasket component 27 in returning to its original shape when compression of the gasket 21 is released. The use of relatively inexpensive sponge or foam material for the first gasket component 25, which preferably makes up a substantial portion of the volume of the entire gasket 21, assists in reducing the overall cost of the gasket relative to gaskets made of more expensive conductive elastomers.

Figure 2A:
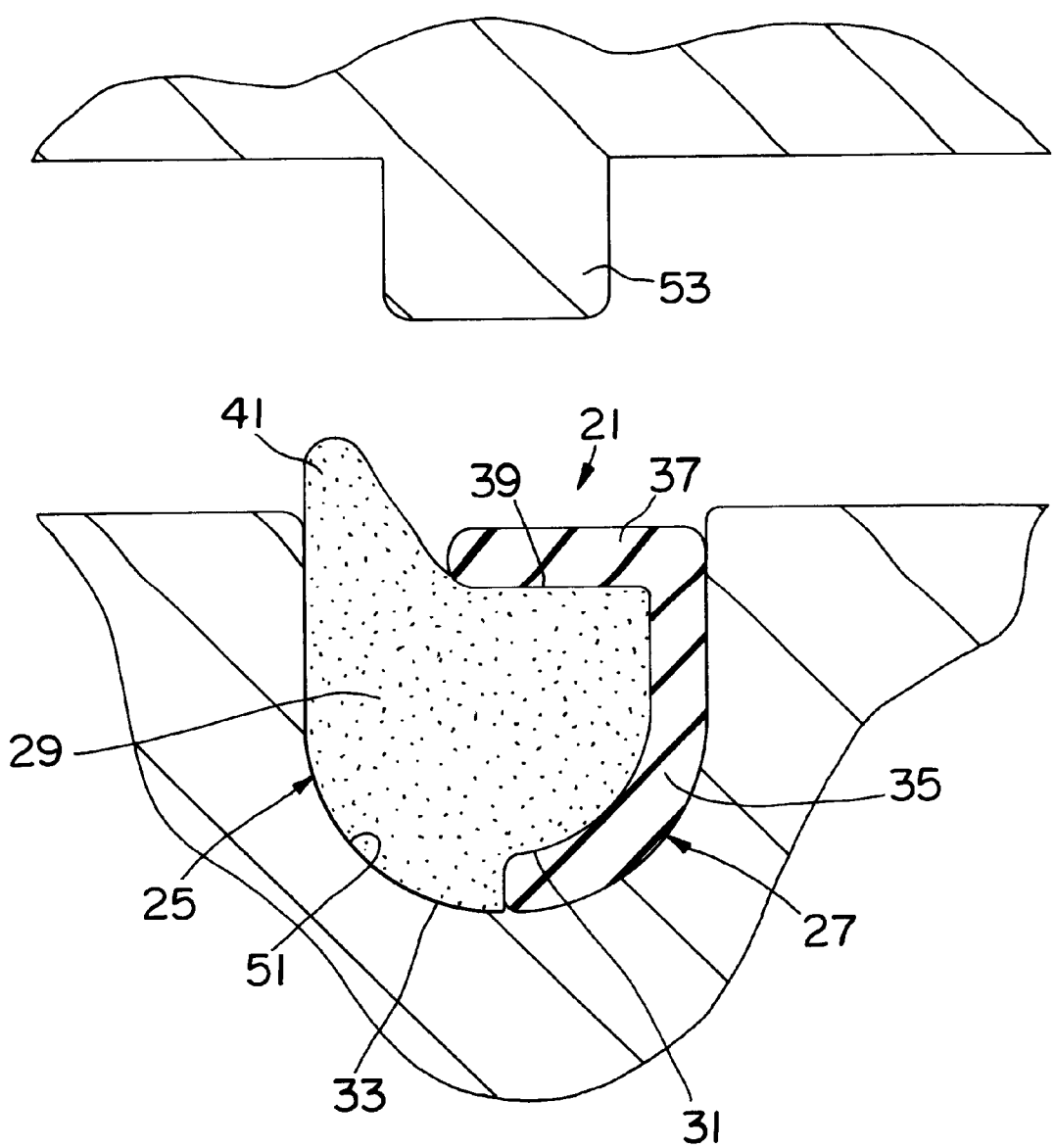
FIG. 2A is a cross-sectional view of a gasket according to an embodiment of the present invention, disposed in a groove of a tongue and groove arrangement shown in an open state.

The shape of the gasket 21 is preferably adapted for specific applications. A presently preferred shape for the gasket 21 for use in an application as shown in FIG. 2A, wherein the gasket is to be disposed, preferably installed, in a groove of a tongue and groove arrangement around a door, is such that the first gasket component 25 includes a first portion 29 that, in cross-section, defines a substantially half circle shape. A recess 31 is preferably provided in a periphery 33 of the first portion 29, and the second gasket component 27 preferably includes a curved portion 35 that is disposed in the recess. The second gasket component 27 preferably also includes a portion 37 extending substantially perpendicular to the curved portion 35 and that is disposed on a flat portion 39 of the first portion 29.

Figure 2B:
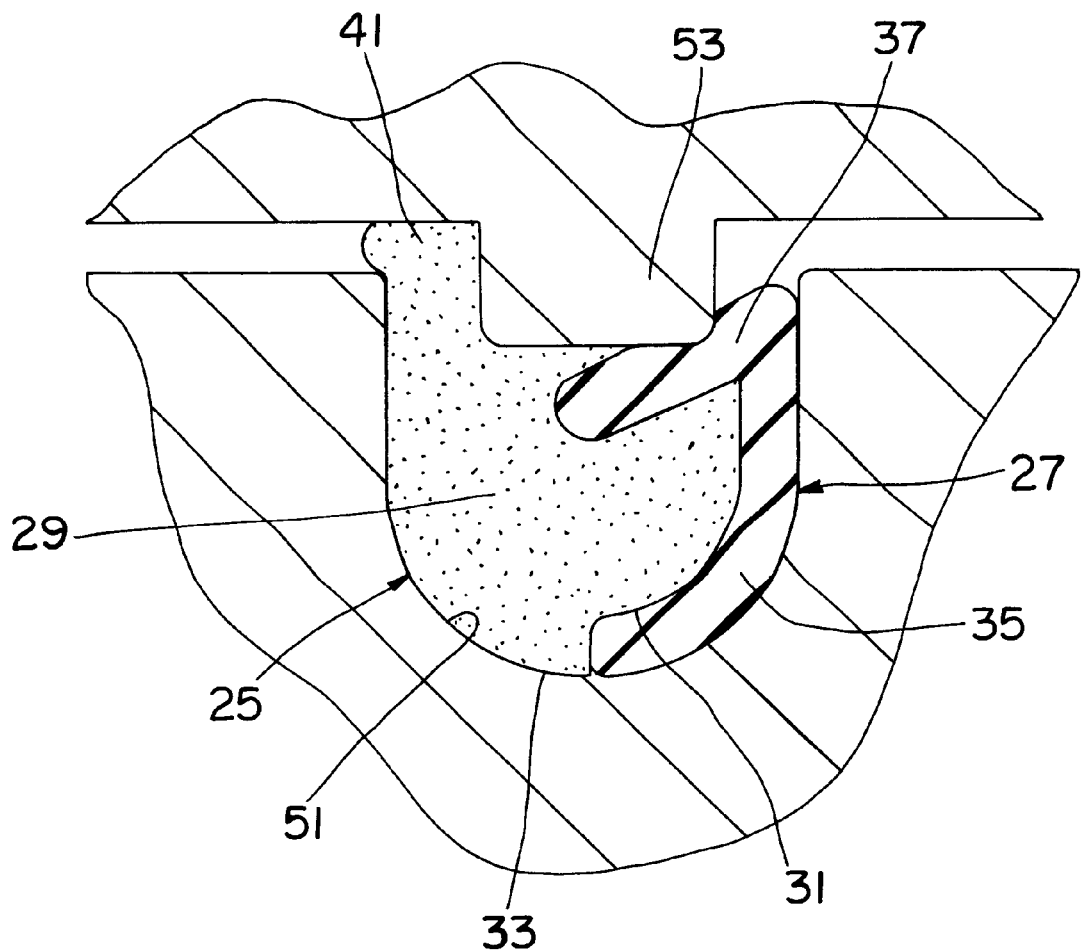
FIG. 2B is a cross-sectional view of a gasket according to an embodiment of the present invention, disposed in a groove of a tongue and groove arrangement shown in a closed state.

By providing a first gasket component with good shape memory characteristics, the first gasket component preferably assists the second gasket component in returning to its uncompressed shape when compression of the gasket 21 is released. The shape of the second gasket component 27 is preferably such that, when the gasket 21 is compressed, for example, in a tongue and groove around a door and a surrounding surface, the second gasket component provides complete EMI/RFI shielding of any gap between the door and the surface, as seen in FIG. 2B, showing the gasket 21 disposed in the groove 51 and compressed by the tongue 53. The second gasket component 27 preferably extends across the entire gap between the tongue 53 and groove 51 for EMI/RFI shielding, and the first gasket component 25, together with the second gasket component, preferably fills the entire, or substantially the entire, volume of the gap to provide environmental protection. The first gasket component 25 preferably also includes a second portion 41 that, in cross-section, defines a substantially triangular shape extending from the flat portion 39 of the first portion 29. The second portion 41 assists in providing a good environmental seal.

The first gasket component 25 and the second gasket component 27 are preferably vulcanized together, however, the joint between the components can take other forms suitable for the specific application to which the gasket 21 will be used. For example, the first gasket component 25 and the second gasket component 27 may be joined by an adhesive.

The gasket 21 may, if desired or necessary, include components in addition to the first and second gasket components 25 and 27 joined together. For example, it may be desired or necessary to provide additional gasket components to provide further desired characteristics to the gasket.

Figure 3:
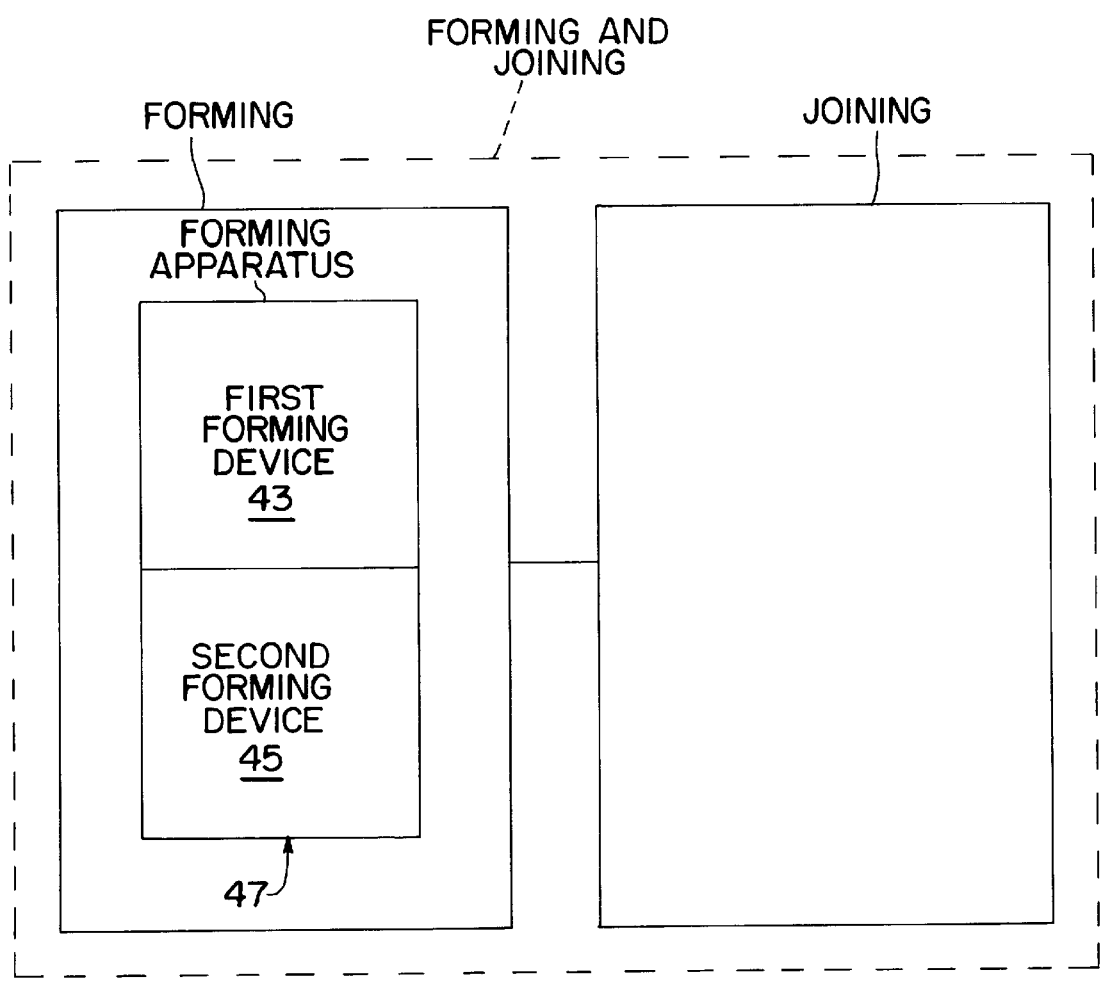
FIG. 3 is a block diagram showing a method for making a gasket according to the present invention.

A method according to the present invention for making a gasket 21 is illustrated diagrammatically in FIG. 3. According to the method, a forming step or steps takes place when a first gasket component 25 is formed by a device 43 such as an extrusion apparatus, and a second gasket component 27 is formed by a device 45 such as an extrusion apparatus. The device 43 and the device 45 preferably form part of an apparatus 47 for coextruding the first and second gasket components 25 and 27 to form the strip. The first gasket component 25 is joined to the second gasket component 27, preferably by being coextruded. The first gasket component and the second gasket component 25 and 27 may be joined by being vulcanized together as they are coextruded, or joining may comprise a separate step subsequent to extrusion or coextrusion, such as by joining the gasket components through vulcanization in a heated die after extrusion. If desired or necessary, joining may be accomplished through techniques other than vulcanization, such as through use of adhesive. The forming and joining steps preferably occur continuously, such as through continuous coextrusion and vulcanization.

While this invention has been illustrated and described in accordance with a preferred embodiment, it is recognized that variations and changes may be made therein without departing from the invention as set forth in the claims.

What is claimed is:

1. A gasket comprising an elongated strip including a first resilient gasket component and a second resilient gasket component having shielding properties, the first and second gasket components being joined together, wherein the first gasket component includes a first portion that, in cross-section, defines a substantially half circle shape, and a recess is provided in a periphery of the first portion, and the second gasket component includes a curved portion that is disposed in the recess, wherein the second gasket component includes a portion extending substantially perpendicular to the curved portion and that is disposed on a flat portion of the first portion and wherein the first gasket component includes a second portion that, in cross-section defines a substantially triangular shape extending from the flat portion of the first portion.

2. The gasket as set forth in claim 1, wherein the first gasket component is a closed cell, silicone sponge.

3. The gasket as set forth in claim 2, wherein the second gasket component is a conductive material-filled silicone.

4. The gasket as set forth in claim 3, wherein the second gasket component is a nickel-filled silicone.

5. The gasket as set forth in claim 1, wherein the second gasket component is a conductive material-filled silicone.

6. The gasket as set forth in claim 5, wherein conductive material forming part of the second gasket component is selected from the group consisting of nickel, silver-plated aluminum, silver-plated glass, nickel-coated graphite, and passivated aluminum.

7. The gasket as set forth in claim 5, wherein the second gasket component is a nickel-filled silicone.

8. The gasket as set forth in claim 1, wherein the first gasket component is more compressible than the second gasket component.

9. The gasket as set forth in claim 1, wherein the first gasket component and the second gasket component are vulcanized together.

10. The gasket as set forth in claim 1, wherein at least one of the first and second gasket components are extrusions.

11. The gasket as set forth in claim 1, wherein a surface of the gasket proximate a transition line between the first gasket component and the second gasket component is substantially smooth.

12. The gasket as set forth in claim 1, wherein the second gasket component extends around the first gasket component between two opposing points on the gasket intended to be contacted by a tongue and groove of a door to be sealed.

13. A method for making a gasket, comprising the steps of: forming a first resilient gasket component that, in cross-section, defines a substantially half circle shape, and that has a recess provided in a periphery thereof;

forming a second resilient gasket component having a curved portion that is disposed in the recess, the second gasket component having shielding properties, wherein the second gasket component includes a portion extending substantially perpendicular to the curved portion and that is disposed on a flat portion of the first portion, and wherein the first gasket component includes a second portion that. in cross-section, defines a substantially triangular shape extending from the flat portion of the first portion; and joining the first gasket component to the second gasket component.

14. The method for making a gasket as set forth in claim 13, wherein the first gasket component and the second gasket component are joined by being vulcanized together.

15. The method for making a gasket as set forth in claim 13, wherein the first gasket component and the second gasket component are formed and joined by being coextruded and vulcanized together.

16. The method for making a gasket as set forth in claim 13, wherein the first gasket component and the second gasket component are formed and joined by being continuously coextruded and vulcanized together.

17. The method for making a gasket as set forth in claim 13, wherein at least one of the first gasket component and the second gasket component is formed by being extruded.

18. The method as set forth in claim 13, wherein the first gasket component and the second gasket component are joined to each other such that a surface of the gasket proximate a transition line between the first gasket component and the second gasket component is substantially smooth.

19. The method as set forth in claim 13, wherein the second gasket component is joined to the first gasket component such that the second gasket component extends around the first gasket component between two opposing points on the gasket intended to be contacted by a tongue and groove of a door to be sealed.

* * * * *